United States Patent
Miller et al.

(10) Patent No.: US 10,696,380 B2
(45) Date of Patent: Jun. 30, 2020

(54) AERODYNAMIC CONTROL SURFACE OPERATING SYSTEM FOR AIRCRAFT USING VARIABLE TRANSMISSION

(71) Applicant: Hamilton Sundstrand Corporation, Charlotte, NC (US)

(72) Inventors: Christian Miller, Beloit, WI (US); Yuniya S. Bishop, Dixon, IL (US); Erik Harrington, Machesney Park, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 427 days.

(21) Appl. No.: 15/654,963

(22) Filed: Jul. 20, 2017

(65) Prior Publication Data
US 2019/0023378 A1    Jan. 24, 2019

(51) Int. Cl.
| | |
|---|---|
| *B64C 13/34* | (2006.01) |
| *B64C 13/28* | (2006.01) |
| *B64C 13/16* | (2006.01) |
| *B64C 9/18* | (2006.01) |

(52) U.S. Cl.
CPC .............. *B64C 13/34* (2013.01); *B64C 13/16* (2013.01); *B64C 13/28* (2013.01); *B64C 9/18* (2013.01)

(58) Field of Classification Search
CPC ......... B64C 13/16; B64C 13/28; B64C 13/34; B64C 9/18; B64C 9/02; B64C 13/24; B64C 9/16; B64C 9/22; B64C 9/26; B64C 9/24
See application file for complete search history.

(56) References Cited

U.S. PATENT DOCUMENTS

| | | | | |
|---|---|---|---|---|
| 2,175,584 | A * | 10/1939 | Zand | B64C 13/24 244/231 |
| 2,796,774 | A * | 6/1957 | Peed, Jr. | B64C 13/24 74/522 |
| 2,873,833 | A * | 2/1959 | Hogan | F16D 41/22 192/41 R |
| 2,893,258 | A * | 7/1959 | Meyer | F16H 25/2015 74/89.38 |

(Continued)

FOREIGN PATENT DOCUMENTS

| | | |
|---|---|---|
| EP | 2902314 A1 | 8/2015 |
| GB | 899128 A | 6/1962 |

(Continued)

OTHER PUBLICATIONS

YouTube. (https://www.youtube.com/watch?v=PEq5_b4LWNY, Understanding CVT; Mar. 23, 2016 (Year: 2016).*

(Continued)

*Primary Examiner* — Medhat Badawi
(74) *Attorney, Agent, or Firm* — Cantor Colburn LLP

(57) ABSTRACT

Control surface operating systems for controlling aerodynamic control surfaces of aircraft are provided. The systems includes a drive system operably connected to a drive shaft, the drive system including a continuously variable transmission, at least one actuator operably connected to the drive shaft and arranged to convert rotational movement of the drive shaft to move at least a portion of the aerodynamic control surface, and at least one control surface operably connected to the at least one actuator, wherein the at least one control surface is adjusted by the at least one actuator.

17 Claims, 3 Drawing Sheets

(56) References Cited

U.S. PATENT DOCUMENTS

| | | | | |
|---|---|---|---|---|
| 2,931,928 A * | 4/1960 | Fehn, Sr. | ............... | B60L 50/30 310/95 |
| 2,941,638 A * | 6/1960 | Hoover | ............... | G05G 23/00 477/9 |
| 3,043,539 A * | 7/1962 | Bishop | ............... | G05D 1/0061 244/76 R |
| 3,773,282 A * | 11/1973 | Sands | ............... | B64C 13/24 244/223 |
| 3,795,373 A * | 3/1974 | Gerard | ............... | B64C 3/385 244/48 |
| 4,318,304 A * | 3/1982 | Lang | ............... | F16H 25/2021 74/89.38 |
| 4,362,067 A * | 12/1982 | Earl | ............... | F02C 9/00 244/76 R |
| 4,401,077 A * | 8/1983 | Earl | ............... | F02C 9/00 123/376 |
| 4,466,520 A * | 8/1984 | Herman | ............... | F16D 11/16 192/25 |
| 4,595,158 A * | 6/1986 | Robinson | ............... | B64C 9/02 244/223 |
| 4,723,099 A * | 2/1988 | Herzig | ............... | H01H 3/22 307/140 |
| 4,817,452 A * | 4/1989 | Burkey | ............... | B62K 23/00 188/2 D |
| 4,858,691 A * | 8/1989 | Ilfrey | ............... | E21B 43/045 166/278 |
| 5,104,062 A * | 4/1992 | Glaze | ............... | B64C 13/40 244/99.2 |
| 5,518,466 A * | 5/1996 | Tiedeman | ............... | F16H 35/10 475/342 |
| 5,628,234 A * | 5/1997 | Crook | ............... | F16H 37/08 74/665 B |
| 6,241,182 B1 * | 6/2001 | Durandeau | ............... | B64C 13/505 244/99.4 |
| 6,354,169 B1 * | 3/2002 | Toyoshima | ............... | B60H 1/00842 177/184 |
| 6,394,396 B2 * | 5/2002 | Gleine | ............... | B64C 3/46 244/198 |
| 7,134,672 B2 * | 11/2006 | Beishline | ............... | B60G 17/0152 280/5.502 |
| 8,002,216 B2 * | 8/2011 | Decker | ............... | B64C 11/305 244/58 |
| 8,051,739 B2 * | 11/2011 | Nishiura | ............... | B62J 25/00 280/294 |
| 8,382,368 B2 * | 2/2013 | Huynh | ............... | B60H 1/00792 374/141 |
| 8,534,610 B1 * | 9/2013 | Pitt | ............... | B64C 9/22 244/214 |
| 8,596,585 B2 * | 12/2013 | Havar | ............... | B64C 9/24 244/214 |
| 8,690,099 B2 * | 4/2014 | Burns | ............... | B64D 27/16 244/53 R |
| 8,839,926 B2 * | 9/2014 | Hou | ............... | F16D 11/16 192/39 |
| 9,328,661 B2 * | 5/2016 | Ho | ............... | F02C 7/00 |
| 9,868,515 B2 * | 1/2018 | Nakagawa | ............... | B64D 41/00 |
| 10,088,006 B2 * | 10/2018 | Fox | ............... | B64C 13/40 |
| 10,107,347 B2 * | 10/2018 | Fox | ............... | F16F 15/073 |
| 2005/0252318 A1 * | 11/2005 | Corney | ............... | F16H 25/2021 74/89.23 |
| 2010/0269605 A1 * | 10/2010 | Lester | ............... | F16H 33/08 74/125.5 |
| 2011/0295475 A1 * | 12/2011 | Shimizu | ............... | F16H 61/0403 701/66 |
| 2012/0097791 A1 * | 4/2012 | Turner | ............... | B64C 3/48 244/1 N |
| 2013/0193263 A1 * | 8/2013 | Schweighart | ............... | B60F 5/02 244/2 |
| 2015/0210379 A1 * | 7/2015 | Henning | ............... | B64C 9/22 244/214 |
| 2017/0362999 A1 * | 12/2017 | Abe | ............... | F02K 3/06 |
| 2019/0023378 A1 * | 1/2019 | Miller | ............... | B64C 13/28 |

FOREIGN PATENT DOCUMENTS

| | | |
|---|---|---|
| GB | 2069426 A | 8/1981 |
| WO | 2015155587 A2 | 10/2015 |

OTHER PUBLICATIONS

"Variomatic Daf 66", 4466pascal: published on Jun. 30, 2016, XP054978663; Retrieved from the Internet on Sep. 12, 2018: https://www.youtube.com/watch?v=2NeyoNdsHTI (2 pages).

European Search Report, European Application No. 18184399.6, dated Sep. 14, 2018, European Patent Office; EP Search Report 13 pages.

* cited by examiner

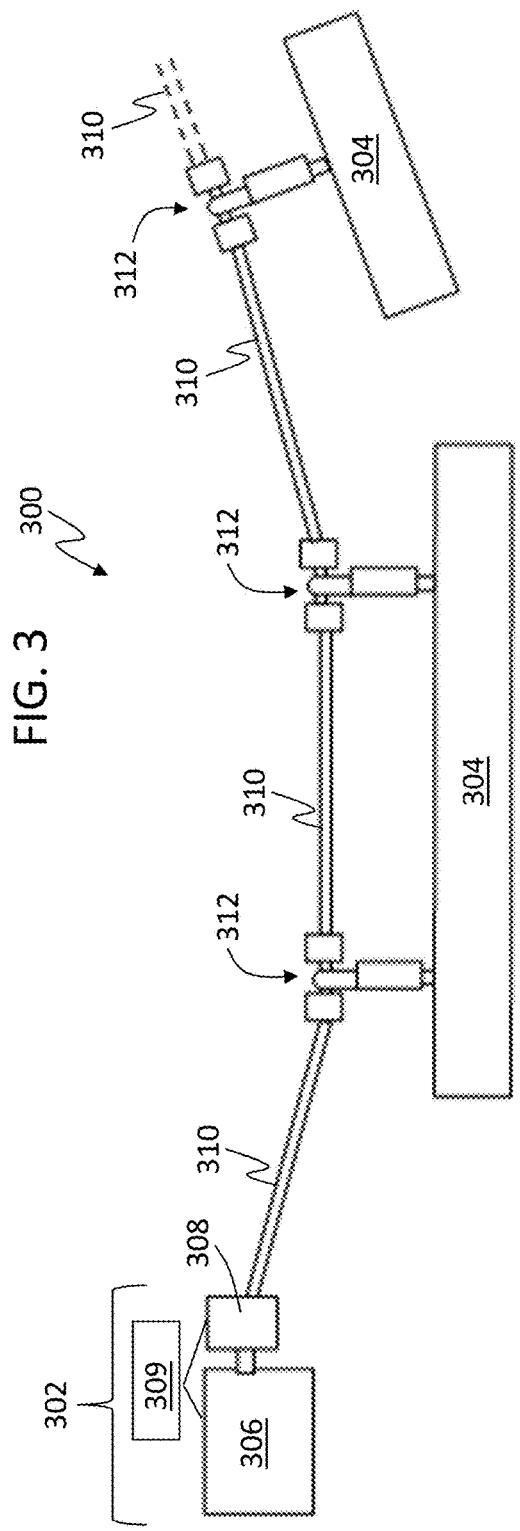
FIG. 3
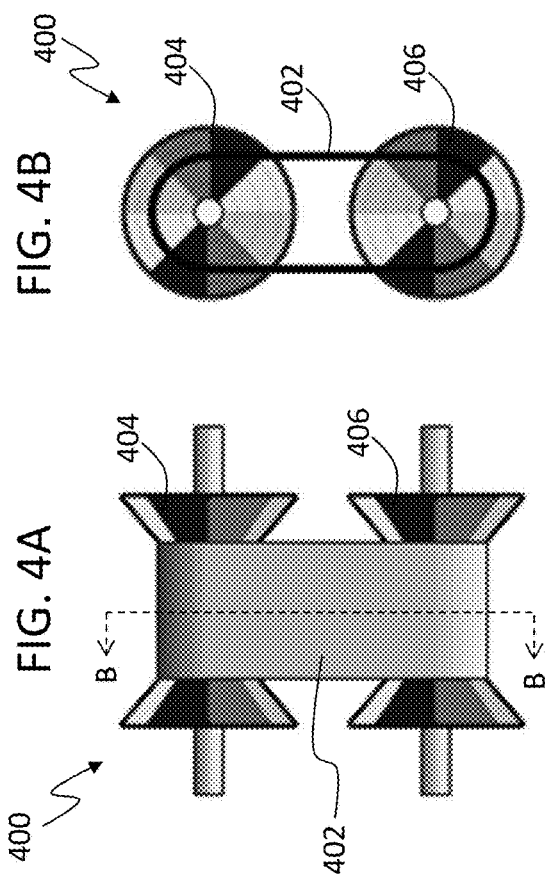
FIG. 4A
FIG. 4B

AERODYNAMIC CONTROL SURFACE OPERATING SYSTEM FOR AIRCRAFT USING VARIABLE TRANSMISSION

BACKGROUND

Modern aircraft often use a variety of high lift leading and trailing edge devices to improve high angle of attack performance during various phases of flight, for example, takeoff and landing. One such device is a trailing edge flap. Current trailing edge flaps generally have a stowed position in which the flap forms a portion of a trailing edge of a wing, and one or more deployed positions in which the flap extends forward and down to increase the camber and/or plan form area of the wing. The stowed position is generally associated with low drag at low angles of attack and can be suitable for cruise and other low angle of attack operations. The extended position(s) is/are generally associated with improved air flow characteristics over the aircraft's wing at higher angles of attack.

Proper extension and retraction of such flaps is important for control of the aircraft during different maneuvers. In general, such systems can include a control unit that causes a main drive unit to produce rotation of a shaft. This rotation can then be converted to flap extension in known manners such as by use of a ball screw. In such systems, each flap typically includes two actuators, one for each side of the flap. If the two actuators do not extend two sides of the flap the same amount, the flap experiences skew. Further, applying an optimum operational speed (e.g., rotational speed) can be desirable to achieve efficient extension and/or retraction of the flaps.

SUMMARY

According to some embodiments, control surface operating systems for controlling aerodynamic control surfaces of aircraft are provided. The systems include a drive system operably connected to a drive shaft, the drive system including a continuously variable transmission, at least one actuator operably connected to the drive shaft and arranged to convert rotational movement of the drive shaft to move at least a portion of the aerodynamic control surface; and at least one control surface operably connected to the at least one actuator, wherein the at least one control surface is adjusted by the at least one actuator.

In addition to one or more of the features described above, or as an alternative, further embodiments of the control surface operating systems may include that the at least one control surface is operably connected to two actuators.

In addition to one or more of the features described above, or as an alternative, further embodiments of the control surface operating systems may include that the drive system includes a power distribution unit arranged to drive the continuously variable transmission.

In addition to one or more of the features described above, or as an alternative, further embodiments of the control surface operating systems may include a controller arranged to control operation of the continuously variable transmission.

In addition to one or more of the features described above, or as an alternative, further embodiments of the control surface operating systems may include that the controller is part of the drive system.

In addition to one or more of the features described above, or as an alternative, further embodiments of the control surface operating systems may include that the controller controls operation of the continuously variable transmission based on a flight condition of the aircraft.

In addition to one or more of the features described above, or as an alternative, further embodiments of the control surface operating systems may include that the at least one control surface is one of a flap or slat on a wing or tail of the aircraft.

In addition to one or more of the features described above, or as an alternative, further embodiments of the control surface operating systems may include that the continuously variable transmission includes at least two conical gear sets to enable variable gear ratios of the continuously variable transmission.

In addition to one or more of the features described above, or as an alternative, further embodiments of the control surface operating systems may include that a belt is driven by the at least two conical gear sets.

In addition to one or more of the features described above, or as an alternative, further embodiments of the control surface operating systems may include that the drive shaft comprises at least one torque tube.

In addition to one or more of the features described above, or as an alternative, further embodiments of the control surface operating systems may include that the drive shaft comprises multiple torque tubes that operably connect a plurality of actuators, wherein the plurality of actuators are arranged to control operation of at least two control surfaces.

In addition to one or more of the features described above, or as an alternative, further embodiments of the control surface operating systems may include that the at least one actuator is a linear actuator.

In addition to one or more of the features described above, or as an alternative, further embodiments of the control surface operating systems may include that the at least one actuator is a rotary actuator.

According to some embodiments, aircraft are provided. The aircraft include at least one aerodynamic control surface and a control surface operating system for controlling aerodynamic control surfaces of the aircraft. The control surface operating system includes a drive system operably connected to a drive shaft, the drive system including a continuously variable transmission and at least one actuator operably connected to the drive shaft and the at least one aerodynamic control surface, the at least one actuator arranged to convert rotational movement of the drive shaft to move at least a portion of the at least one aerodynamic control surface, such that the at least one control surface is adjusted by the at least one actuator.

In addition to one or more of the features described above, or as an alternative, further embodiments of the aircraft may include that the drive system includes a power distribution unit arranged to drive the continuously variable transmission.

In addition to one or more of the features described above, or as an alternative, further embodiments of the aircraft may include that the control surface operating system further comprises a controller arranged to control operation of the continuously variable transmission.

In addition to one or more of the features described above, or as an alternative, further embodiments of the aircraft may include that the controller controls operation of the continuously variable transmission based on a flight condition of the aircraft.

In addition to one or more of the features described above, or as an alternative, further embodiments of the aircraft may include that the at least one control surface is one of a flap or slat on a wing or tail of the aircraft.

In addition to one or more of the features described above, or as an alternative, further embodiments of the aircraft may include that the drive shaft comprises multiple torque tubes that operably connect a plurality of actuators, wherein the plurality of actuators are arranged to control operation of at least two control surfaces of the aircraft.

In addition to one or more of the features described above, or as an alternative, further embodiments of the aircraft may include that the at least one actuator is a linear actuator or a rotary actuator.

According to some embodiments, methods of controlling operation of aerodynamic control surfaces of aircraft are provided. The methods include driving a drive shaft with a continuously variable transmission, the drive shaft operably coupled to at least one actuator and converting rotational movement of the drive shaft using the at least one actuator to move at least a portion of the aerodynamic control surface to adjust the aerodynamic control surface.

In addition to one or more of the features described above, or as an alternative, further embodiments of the methods may include comprising controlling operation of the continuously variable transmission based on a flight condition of the aircraft.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 3 is a schematic illustration of an control surface operating system in accordance with an embodiment of the present disclosure;

FIG. 4A is a plan view illustration of a portion of a continuously variable transmission employed in embodiments of the present disclosure; and FIG. 4B is a cross-sectional illustration of the continuously variable transmission of FIG. 4A as viewed along the line B-B.

DETAILED DESCRIPTION

Disclosed herein are aerodynamic control surface transmission systems that provide drive and operation for aircraft flaps, slats, or other movable aerodynamic control surfaces. The disclosed systems provide solutions for driving movable aerodynamic control surfaces on aircraft. Typically, power distribution units, angle gear boxes, and actuators use fixed ratio gearing to move the movable aerodynamic control surfaces over a full load profile which includes both aiding and opposing static and aerodynamic loads. The fixed gearing drives a larger system power/torque capacity than is necessary, and thus inefficiencies within the system may exist. Examples of inefficiencies in such systems may include chatter, use of complex control algorithms, increased power consumption, etc. Accordingly, embodiments provided herein are directed to aerodynamic control surface transmission systems that include continuously variable transmissions that allow for control at efficient and desirable operating parameters.

The systems descried herein include a continuously variable transmission ("CVT") operably connected to one or more movable aerodynamic control surfaces (e.g., flaps, slats, etc.) on an aircraft. The CVT allows for constant motor operation with variable drive-line speed, thus enabling a smaller range of operation, and thus improved efficiencies. Further, the CVT enables deployment and retraction of movable aerodynamic control surfaces at different speeds, and because of the CVT deployment and retraction can be independently optimized to an operational speed for such action. That is, embodiments provided herein, enable improved operational speeds for the different operations associated with movable aerodynamic control surfaces.

Figure 1:
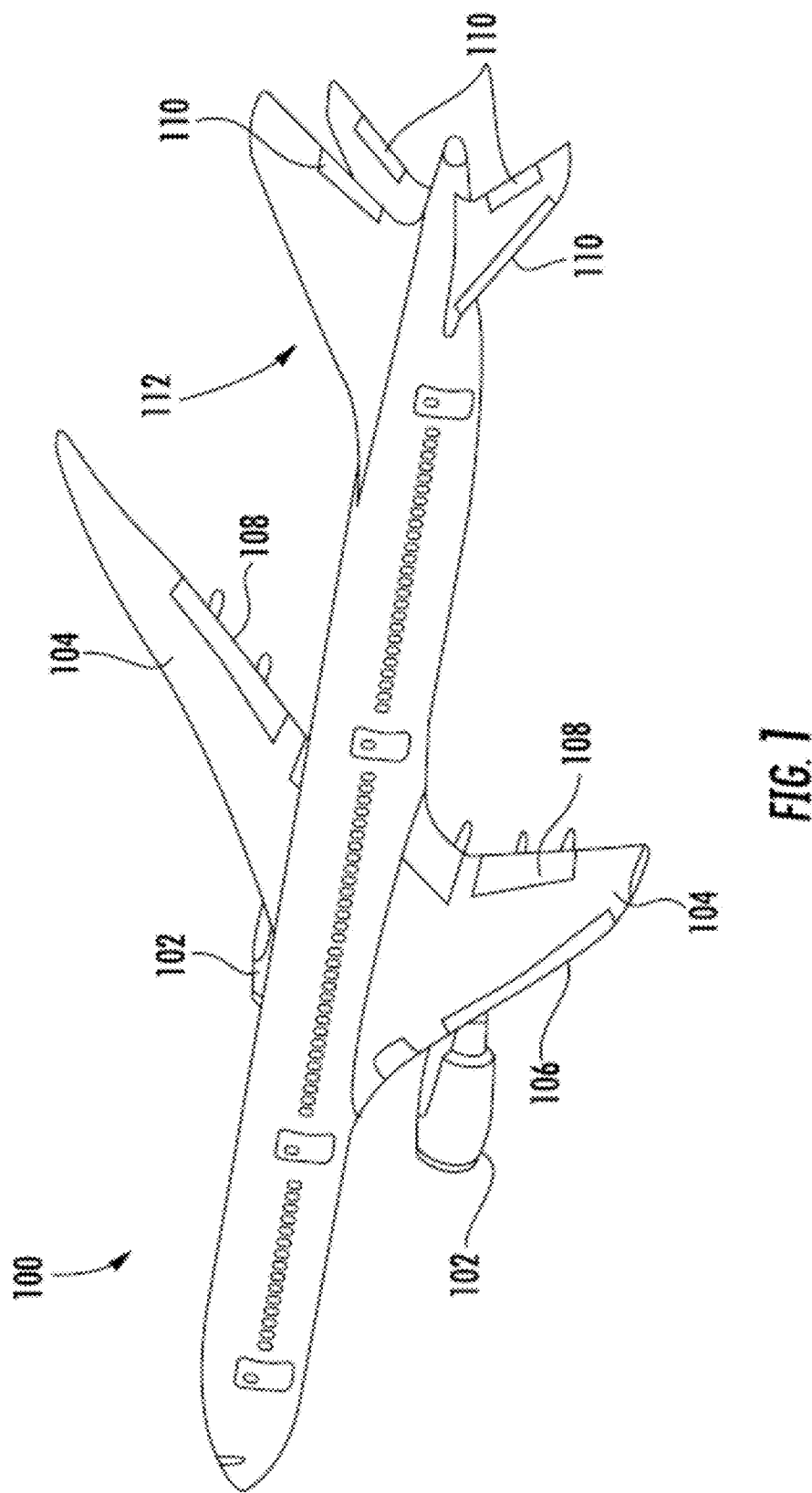
FIG. 1 is a perspective schematic illustration of an aircraft that includes moveable control surfaces.

FIG. 1 illustrates an example of an aircraft 100, illustrated as a commercial aircraft, having aircraft engines 102. The aircraft 100 can embody aspects of the teachings of this disclosure. The aircraft 100, as shown, includes two wings 104 with wing lift systems that each includes one or more aerodynamic control surfaces. As shown, the aerodynamic control surfaces include slats 106 and one or more flaps 108 located on the wings 104. The slats 106 are located on a leading edge of the wings 104 and the flaps 108 are located on a trailing edge of the wings 104. Further, as shown, the aerodynamic control surfaces include slats and/or flaps 110 located on a tail 112 of the aircraft 100. The term "control surface" as used herein can refer to slats, flaps, and/or other controllable surfaces that are operated to enable flight control of the aircraft 100. Although description herein will be discussed with respect to the control surfaces 106, 108 located on the wings 104, those of skill in the art will appreciate that embodiments of the present disclosure can be applied to operation of the control surfaces 110 located on the tail 112 of the aircraft 100. The control surfaces 106, 108, 110 can be driven by one or more actuators that are operably connected to the respective control surfaces 106, 108, 110.

Wing lift systems on aircraft typically interconnect all control actuators on each of the wings with torque tubes or other control rods and a central power distribution unit ("PDU"). In accordance with embodiments of the present disclosure, a CVT with gearing optimized to actuation speeds and torque profiles for control surfaces is attached between the PDU output and one or more torque tubes driving actuators of the control surfaces. In some embodiments, a combination of multiple conical gear sets attached with a belt or chain are arranged to enable variable ratio from input to output speed ratio applied to a power distribution unit on a control system for control surfaces of an aircraft.

Figure 2:
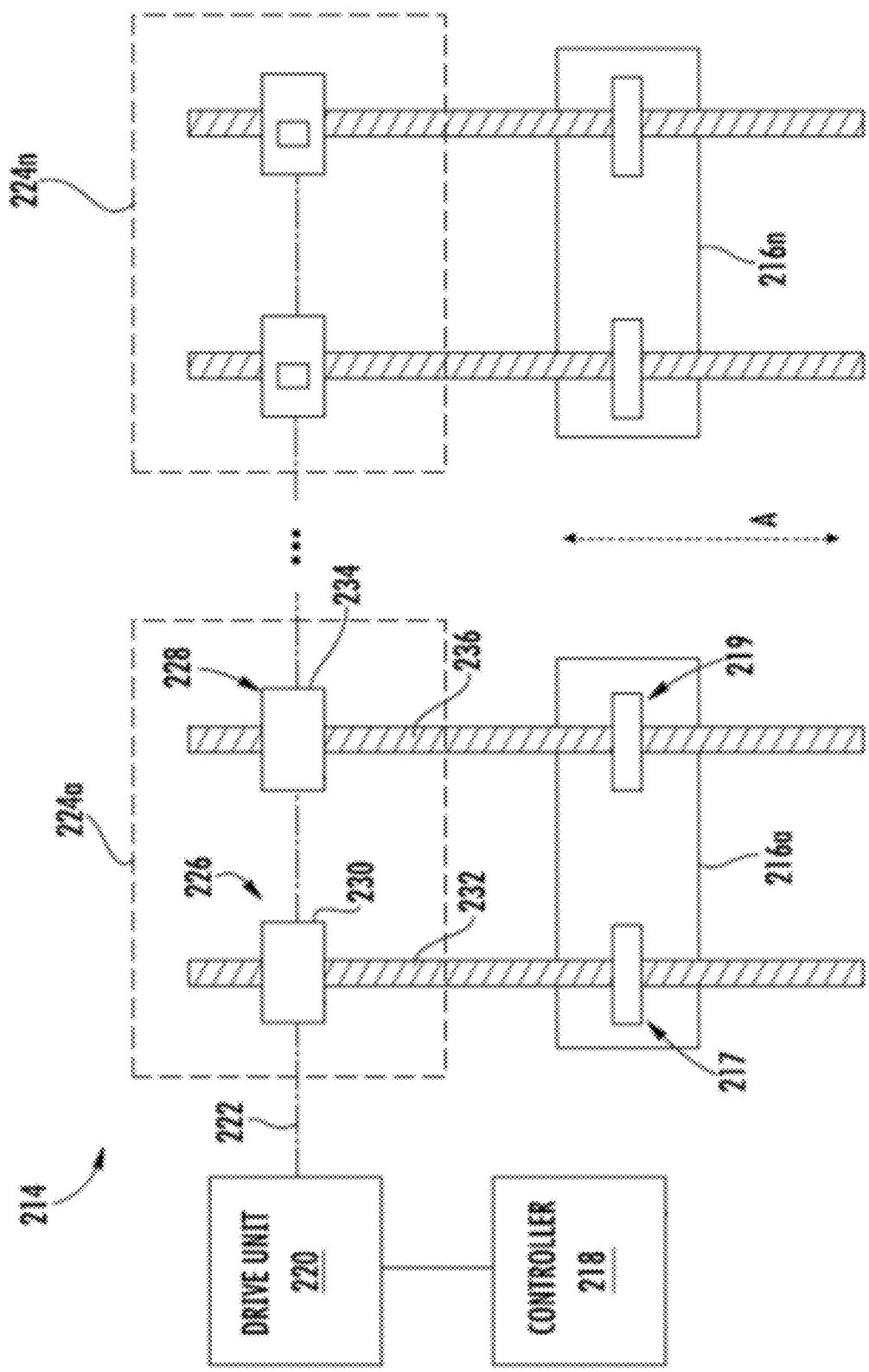
FIG. 2 is schematic illustration of an actuator control system that can in corporate embodiments of the present disclosure.

FIG. 2 illustrates, generally, a system 214 that is operable and/or controllable to control the movement, operation, and/or location of one or more control surfaces 216a . . . 216n of an aircraft (e.g., control surfaces 106, 108, 110). As illustrated in FIG. 2, the control surfaces 216a . . . 216n are illustrated and controlled by the system 214. Those of skill in the art will appreciate that any number of control surfaces 216a . . . 216n can be controlled and monitored by the system 214, although only two control surfaces 216a, 216n are illustrated in FIG. 2. The control surfaces 216a, 216n can be flaps and/or slats, such as slats 106 and flaps 108 illustrated in FIG. 1 and/or control surfaces 110 located on the tail 112 of the aircraft 100.

The system 214 includes a controller 218. The controller 218 is configured to issue control commands to a drive unit 220. The commands can include commands to cause the drive unit 220 to rotate a drive shaft 222 in order to move one or more of the control surfaces 216a, 216n in a desired direction or motion. For example, the drive shaft 222 can be rotated to cause one or more of the control surfaces 216a . . . 216n to move in a direction in or out as generally indicated by arrow A. The drive shaft 222 may be one or more torque tubes or other similar rods or structures that can convey rotational motion along a length of a wing or other aircraft structure.

To convert the rotary motion of the drive shaft 222 into linear motion to move the control surfaces 216a, 216n, one or more actuator units 224a . . . 224n are provided within the system 214. As shown, each control surface 216a . . . 216n is operably connected to a dedicated and/or respective actuator unit 224a . . . 224n. As shown, the drive shaft 222 is schematically shown as interconnecting the various actuators 226, 228 and the various actuator units 224a . . . 224n. However, those of skill in the art will appreciate that the various actuators and/or actuator units may be independent and thus not interconnected or other types of connection arrangements are possible without departing from the scope of the present disclosure.

Each actuator unit 224a . . . 224n, as shown, includes two actuators operably connected to the respective control surface 216a . . . 216n. For example, a first actuator unit 224a includes first and second actuators 226, 228. The first actuator 226 includes a first actuator drive unit 230 and a first linear translation element 232. The first actuator drive unit 230 receives rotary motion from the drive shaft 222 and causes the first linear translation element 232 to move linearly in a direction shown generally by arrow A. Similarly, the second actuator 228 includes a second actuator drive unit 234 and a second linear translation element 236. The second actuator drive unit 234 also receives rotary motion from the drive shaft 222 and causes the second linear translation element 236 to move linearly in the direction shown generally by arrow A. The linear translation elements 232, 236 are operably connected to respective portions of the first control surface 216a. Thus, movement of the first linear translation element 232 causes a first portion 217 of the first control surface 216a to move and movement of the second linear translation element 236 causes a second portion 219 of the first control surface 216a to move. The first and second portions 217, 219 of the first control surface 216a may be ends or sides of the first control surface 216a and movement thereof adjusts position, angle, tilt, etc. of the control surface 216a to enable flight of an aircraft.

Although shown in FIG. 2 and described above as linear actuators. Those of skill in the art will appreciate that embodiment provided herein can be applied to other type of actuators that are employed to move control surfaces of aircraft. For example, in some embodiments, rotary actuators may be employed using a rack and pinion arrangement.

Turning now to FIG. 3, a control surface operating system 300 arranged in accordance with an embodiment of the present disclosure is shown. The control surface operating system 300 is a flight control system for an aircraft (e.g., as shown in FIG. 1) that includes a drive system 302 that is operably connected to one or more control surfaces 304. The drive system 302 includes a power distribution unit 306 and a transmission 308. The power distribution unit 306 drives the transmission 308 to in turn rotate one or more drive shafts 310. The rotational movement of the drive shafts 310 is converted to linear movement at one or more actuator units 312 that are operably connected to control surfaces 304. In other embodiments, the movement of the actuator may be non-linear (e.g., rotary) as will be appreciated by those of skill in the art.

The power distribution unit 306 can include one or more motors that drive or operate the transmission 308. In one non-limiting embodiment, the power distribution unit 306 includes two motors and a speed summing differential gearbox. The speed summing differential gearbox is arranged to enable adjusting a driveline speed (e.g., speed of rotation of the drive shaft 310). In some embodiments, the transmission 308 is operably connected to the gearbox of the power distribution unit 306. In other embodiments, the transmission 308 can be integrated into the gearbox of the power distribution unit 306.

As noted, the drive system 302 includes the power distribution unit 306 and the transmission 308 for enabling operation of the control surfaces 304. The transmission 308 is a continuously variable transmission. The continuously variable transmission 308 is controllable by a control unit or other controller 309 e.g., by the controller 218 shown in FIG. 2). In some embodiments, the controller can be integral or part of the power distribution unit 306. The controller 309 is arranged to control the continuously variable transmission 308 and/or the power distribution unit 306 at one or more predetermined operating ratios such that a desired drive is applied to the drive shafts 310 to achieve a desired operation or movement of the control surfaces 304. In some embodiments, the controller 309 can be located separate or apart from the drive system 302, but operably connected or in communication therewith.

Turning now to FIGS. 4A-4B, a non-limiting example of a portion of a continuously variable transmission 400 in accordance with an embodiment of the present disclosure is schematically shown. FIG. 4A is a plan schematic illustration of a transmission belt 402 that is driven by conical gear sets 404, 406, and FIG. 4B is a view along the line B-B shown in FIG. 4A. That is, the continuously variable transmission 400 includes a combination of multiple conical gear sets 404, 406 attached with a belt 402 that allows variable ratio from input to output speed ratio applied to a power distribution unit of a control panel operating system, as shown and described above. Although shown as a belt 402, those of skill in the art will appreciate that other types of attachment elements can be employed without departing from the scope of the present disclosure, including, but not limited to chains. Further, although shown as conical gear sets 404, 406, stepped cylindrical gears sets or other types of gears sets may be employed without departing from the scope of the present disclosure.

In accordance with embodiments of the present disclosure, the continuously variable transmission of the control surface operating system can be operated at a first gear or speed for extension or deployment operations of the control surface(s) and at a second gear or speed that is different from the first gear or speed for retraction operations of the control surface(s). The different operating gears of the continuously variable transmission can be optimized to perform specific operations at specific loads and/or flight conditions. For example, during a take-off operation of an aircraft, the control surfaces of the aircraft are typically extended to generate lift, and thus high loads may be applied to the control surfaces, and as such a specific motor operating speed should be employed. However, during a retraction operation, e.g., at altitude (after take-off), the load may be significantly less, and thus motor operating speeds may not be required to be as high as higher load situations. The continuously variable transmission of the present disclosure enables operating at different speeds that are predefined for specific load conditions, operating functions (e.g., extension/retraction of control surfaces), based on demand of a pilot, etc. That is, the continuously variable transmission of embodiments of the present disclosure can be controlled based on a flight condition (e.g., take-off, ascent, cruise, descent, landing, etc.).

In an example embodiment, a high-driveline and motor torque aircraft condition for the wing high lift system occurs when the aircraft is operating near a maximum airspeed condition after a long flight at cold temperature. As will be appreciated by those of skill in the art, the tare losses within the actuators in combination with the high aerodynamic wing loads that are driven by the actuation system cascade through the driveline back to the power drive unit. In a contrasting scenario, the aircraft may require very quick response from the actuation system to stow flap and slat panels (aerodynamic control surfaces) following a take-off with a short distance requiring a high rate of climb. In order to accelerate to a higher airspeed, the aircraft may need to change panel configuration to stow the slat and flap panels quickly with low magnitude tare and aerodynamic loads (potentially even aiding aerodynamic loads). Such external loading situations may be very conducive to a multi-geared transmission or continuously variable transmission because the high speed could be achieved by an efficient change in gearing rather than designing an oversized power drive unit and associated inefficient power draw to the aircraft. A similar situation can occur when the aircraft is on the ground with near zero aerodynamic loads and the system enables reconfiguration more rapidly to desired panel positions, either stowed or deployed to a take-off position, as compared to traditional systems. In general aerodynamic loads are a function of airspeed and altitude, thus an electronic control unit of the aircraft could employ feedback from the aircraft with respect to these parameters (airspeed, altitude) to determine an optimal speed to run the continuously variable transmission to meet both optimal transit times (high speed) as well as deploy under extreme loading conditions (low speed).

Advantageously, embodiments provided herein are directed to control surface operating systems for aircraft that include continuously variable transmissions. When installing a typical system (single gear system), the transmission is set to operate at a specific speed such that one of deploying or retracting is optimized. As such, the other of the deploying or retracting is not optimized for rotational speed, and thus inefficiencies will be present. That is, with traditional systems, torque speed curves must be optimized for a given speed. Operation that tries to achieve multiple torque/speed operational points is not optimized for electromagnetics. Usage of a continuously variable transmission, as provided herein, enables optimum performance of the motor magnetics while providing wide range of available operational speeds.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A control surface operating system for controlling aerodynamic control surfaces of an aircraft, the system comprising:
    a drive system operably connected to a drive shaft comprising at least one torque tube, the drive system including a continuously variable transmission;
    at least one actuator operably connected to the drive shaft and arranged to convert rotational movement of the drive shaft to move at least a portion of the aerodynamic control surface; and
    at least one control surface operably connected to the at least one actuator, wherein the at least one control surface is adjusted by the at least one actuator,
    wherein the drive system includes a power distribution unit arranged to drive the continuously variable transmission, wherein the power distribution unit comprises two motors and a speed summing differential gearbox configured to adjust a driveline speed.

2. The control surface operating system of claim 1, wherein the at least one control surface is operably connected to two actuators.

3. The control surface operating system of claim 1, further comprising a controller arranged to control operation of the continuously variable transmission.

4. The control surface operating system of claim 3, wherein the controller is part of the drive system.

5. The control surface operating system of claim 3, wherein the controller controls operation of the continuously variable transmission based on a flight condition of the aircraft.

6. The control surface operating system of claim 1, wherein the at least one control surface is one of a flap or slat on a wing or tail of the aircraft.

7. The control surface operating system of claim 1, wherein the continuously variable transmission includes at least two conical gear sets to enable variable gear ratios of the continuously variable transmission.

8. The control surface operating system of claim 7, wherein a belt is driven by the at least two conical gear sets.

9. The control surface operating system of claim 1, wherein the drive shaft comprises multiple torque tubes that operably connect a plurality of actuators, wherein the plurality of actuators are arranged to control operation of at least two control surfaces.

10. The control surface operating system of claim 1, wherein the at least one actuator is a linear actuator.

11. The control surface operating system of claim 1, wherein the at least one actuator is a rotary actuator.

12. An aircraft comprising:
    at least one aerodynamic control surface; and
    a control surface operating system for controlling aerodynamic control surfaces of the aircraft, the control surface operating system comprising:
    a drive system operably connected to a drive shaft comprising at least one torque tube, the drive system including a continuously variable transmission and at least one actuator operably connected to the drive shaft and the at least one aerodynamic control surface, the at least one actuator arranged to convert rotational movement of the drive shaft to move at least a portion of the at least one aerodynamic control surface, such that the at least one control surface is adjusted by the at least one actuator,
    wherein the drive system includes a power distribution unit arranged to drive the continuously variable transmission, wherein the power distribution unit comprises two motors and a speed summing differential gearbox configured to adjust a driveline speed.

13. The aircraft of claim 12, wherein the drive system includes a controller arranged to control operation of the continuously variable transmission, the controller configured to control operation of the continuously variable transmission based on a flight condition of the aircraft.

14. The aircraft of claim 12, wherein the at least one control surface is one of a flap or slat on a wing or tail of the aircraft.

15. The aircraft of claim 12, wherein the drive shaft comprises multiple torque tubes that operably connect a plurality of actuators, wherein the plurality of actuators are arranged to control operation of at least two control surfaces of the aircraft.

16. A method of controlling operation of aerodynamic control surfaces of an aircraft, the method comprising:

driving a drive shaft comprising at least one torque tube with a drive system including a continuously variable transmission, the drive shaft operably coupled to at least one actuator, wherein the drive system includes a power distribution unit arranged to drive the continuously variable transmission, wherein the power distribution unit comprises two motors and a speed summing differential gearbox configured to adjust a driveline speed; and converting rotational movement of the drive shaft using the at least one actuator to move at least a portion of the aerodynamic control surface to adjust the aerodynamic control surface.

17. The method of claim 16, further comprising controlling operation of the continuously variable transmission based on a flight condition of the aircraft.

* * * * *